United States Patent
Sugawara et al.

(10) Patent No.: US 12,321,054 B2
(45) Date of Patent: Jun. 3, 2025

(54) OPTICAL TESTING APPARATUS

(71) Applicant: ADVANTEST Corporation, Tokyo (JP)

(72) Inventors: Toshihiro Sugawara, Gunma (JP); Takao Sakurai, Miyagi (JP)

(73) Assignee: ADVANTEST CORPORATION, Tokyo (JP)

( * ) Notice: Subject to any disclaimer, the term of this patent is extended or adjusted under 35 U.S.C. 154(b) by 330 days.

(21) Appl. No.: 17/637,673

(22) PCT Filed: Jul. 10, 2020

(86) PCT No.: PCT/JP2020/026976
§ 371 (c)(1),
(2) Date: Feb. 23, 2022

(87) PCT Pub. No.: WO2021/075099
PCT Pub. Date: Apr. 22, 2021

(65) Prior Publication Data
US 2022/0276514 A1    Sep. 1, 2022

(30) Foreign Application Priority Data
Oct. 16, 2019   (JP) .................. 2019-189595

(51) Int. Cl.
G02F 1/11      (2006.01)
G02F 1/03      (2006.01)

(52) U.S. Cl.
CPC ............. *G02F 1/113* (2013.01); *G02F 1/03* (2013.01); *G02F 1/116* (2013.01)

(58) Field of Classification Search
CPC . G02F 1/113; G02F 1/03; G02F 1/116; G02F 1/11; G02F 1/33; G02F 1/31; G02F 1/315
See application file for complete search history.

(56) References Cited

U.S. PATENT DOCUMENTS 5,282,014 A    1/1994   Ruhl, Jr. et al.
9,110,154 B1   8/2015   Bates et al.
(Continued)

FOREIGN PATENT DOCUMENTS

JP    2000-275340    10/2000
JP    2001-124855    5/2001
(Continued)

OTHER PUBLICATIONS

Office Action issued by the Taiwan Intellectual Property Office (TIPO) in Taiwanese Patent Application No. 109123202, dated May 31, 2023.
(Continued)

*Primary Examiner* — Ricky L Mack
*Assistant Examiner* — Journey F Sumlar
(74) *Attorney, Agent, or Firm* — Greenblum and Bernstein, P.L.C.

(57) ABSTRACT

According to the present invention, an optical testing apparatus is used in testing an optical measuring instrument. The optical measuring instrument provides an incident light pulse from a light source to an incident object and receives a reflected light pulse as a result of reflection of the incident light pulse at the incident object. The optical testing apparatus includes a testing light source and a rise time control section. The testing light source is arranged to generate a testing light pulse to be provided to the optical measuring instrument. The rise time control section is arranged to control the rise time of the testing light pulse.

8 Claims, 5 Drawing Sheets

(56) References Cited

U.S. PATENT DOCUMENTS

| | | | |
|---|---|---|---|
| 9,837,784 B2* | 12/2017 | Lowder | H01S 3/10046 |
| 10,725,157 B1* | 7/2020 | Yates | G01S 7/4816 |
| 2002/0023903 A1* | 2/2002 | Ann Ngoi | B23K 26/40 |
| | | | 219/121.73 |
| 2007/0024842 A1 | 2/2007 | Nishizawa et al. | |
| 2012/0008128 A1* | 1/2012 | Bamji | G01S 17/36 |
| | | | 356/5.01 |
| 2014/0346318 A1* | 11/2014 | Hardegger | G01J 1/42 |
| | | | 219/121.64 |
| 2015/0116672 A1 | 4/2015 | Woltman et al. | |

FOREIGN PATENT DOCUMENTS

| | | |
|---|---|---|
| JP | 2006-126168 | 5/2006 |
| JP | 2015-155855 | 8/2015 |
| JP | 2015-165196 | 9/2015 |
| JP | 2017-015729 | 1/2017 |
| JP | 2017-504047 | 2/2017 |
| JP | 2019-105577 | 6/2019 |
| KR | 10-2015-0112651 | 10/2015 |

OTHER PUBLICATIONS

International Search Report (ISR) from International Searching Authority (Japan Patent Office) in International Pat. Appl. No. PCT/JP2020/026976, dated Sep. 29, 2020, together with an English language translation.

* cited by examiner

FIG. 1 (a)

Actual Use Aspect

FIG. 1 (b)

Testing Use Aspect

Actual Use Aspect

FIG. 4 (b)

Testing Use Aspect

Fig. 5

OPTICAL TESTING APPARATUS

TECHNICAL FIELD

The present invention relates to testing an instrument arranged to receive reflected light.

BACKGROUND ART

There has conventionally been known an optical measuring instrument arranged to provide incident light to a distance measuring object and receive reflected light. The distance between the optical measuring instrument and the distance measuring object is measured (see Patent Literatures 1, 2, and 3, for example). It is noted that modulating the phase of incident light has also been known (see Abstract of Patent Literature 4, for example).

CITATION LIST

Patent Literature

Patent Literature 1: Japanese Patent Application Publication No. 2017-015729
Patent Literature 2: Japanese Patent Application Publication No. 2006-126168
Patent Literature 3: Japanese Patent Application Publication No. 2000-275340
Patent Literature 4: Japanese Patent Application Publication No. 2019-105577

SUMMARY OF THE INVENTION

Technical Problem

Such a related art optical measuring instrument as described above is arranged to provide light pulses to a distance measuring object, in which the light pulses may have a distinct rise time value. It is therefore preferable to know the tolerance of the rise time of light pulses received by the optical measuring instrument.

It is hence an object of the present invention to measure the tolerance of the rise time of light pulses received by such an optical measuring instrument.

Means for Solving the Problem

According to the present invention, an optical testing apparatus is used in testing an optical measuring instrument that provides an incident light pulse from a light source to an incident object and receives a reflected light pulse as a result of reflection of the incident light pulse at the incident object. The optical testing apparatus includes: a testing light source arranged to generate a testing light pulse to be provided to the optical measuring instrument; and a rise time control section arranged to control the rise time of the testing light pulse.

The thus constructed optical testing apparatus is used in testing an optical measuring instrument that provides an incident light pulse from a light source to an incident object and receives a reflected light pulse as a result of reflection of the incident light pulse at the incident object. A testing light source is arranged to generate a testing light pulse to be provided to the optical measuring instrument. A rise time control section is arranged to control the rise time of the testing light pulse.

According to the optical testing apparatus of the present invention, the optical measuring instrument may be a ToF sensor.

According to the optical testing apparatus of the present invention, the rise time controlled by the rise time control section may correspond to the rise time of the reflected light pulse.

According to the optical testing apparatus of the present invention, the rise time control section may be an acousto-optical crystal.

According to the present invention, the optical testing apparatus may further include a controlling electrical signal output section arranged to output a controlling electrical signal, wherein the rise time control section may be arranged to control the rise time of the testing light pulse according to the controlling electrical signal.

According to the optical testing apparatus of the present invention, the controlling electrical signal output section may have a local electrical signal output section arranged to output a local electrical signal with a predetermined frequency, an electrical pulse output section arranged to output an electrical pulse with a rise time longer than that of the testing light pulse output from the testing light source, and a multiplying section arranged to multiply the local electrical signal by the electrical pulse.

According to the present invention, the optical testing apparatus may further include a piezoelectric transducer arranged to receive and convert the controlling electrical signal into ultrasound, wherein the rise time control section may be arranged to receive the ultrasound and control the rise time of the testing light pulse.

According to the optical testing apparatus of the present invention, the rise time control section may have an electro-optical crystal, a first polarizer arranged between the electro-optical crystal and the testing light source and having a polarized wave transmission axis inclined 45 degrees with respect to the electric field application direction of the electro-optical crystal, and a second polarizer arranged to receive an output from the electro-optical crystal and having a polarized wave transmission axis inclined 45 degrees with respect to the electric field application direction of the electro-optical crystal, and wherein the polarized wave transmission axis of the first polarizer may be orthogonal to the polarized wave transmission axis of the second polarizer.

According to the present invention, the optical testing apparatus may further include a controlling electrical signal output section arranged to output a controlling electrical signal, wherein the rise time control section may be arranged to control the rise time of the testing light pulse according to the controlling electrical signal.

According to the optical testing apparatus of the present invention, the controlling electrical signal output section may have an electrical pulse output section arranged to output an electrical pulse with a rise time longer than that of the testing light pulse output from the testing light source.

BRIEF DESCRIPTION OF DRAWINGS

FIG. 1 shows FIGS. 1 (*a*) and 1 (*b*) show an actual use aspect (FIG. 1 (*a*)) and a testing use aspect (FIG. 1 (*b*)) of an optical measuring instrument 2;

FIGS. 3 (*a*), 3 (*b*) and 3 (*c*) show timing charts of a local electrical signal output from the local signal source 16*a*

(FIG. 3 (a)), an electrical pulse output from the modulation signal source 16b (FIG. 3 (b)), and an output from the mixer 16c (FIG. 3 (c FIGS. 4 (a) and 4 (b) show an actual use aspect (FIG. 4 (a)) and a testing use aspect (FIG. 4 (b)) of an optical measuring instrument 2 according to a variation.

MODES FOR CARRYING OUT THE INVENTION

A description will now be given of an embodiment of the present invention referring to drawings.

Figure 1:
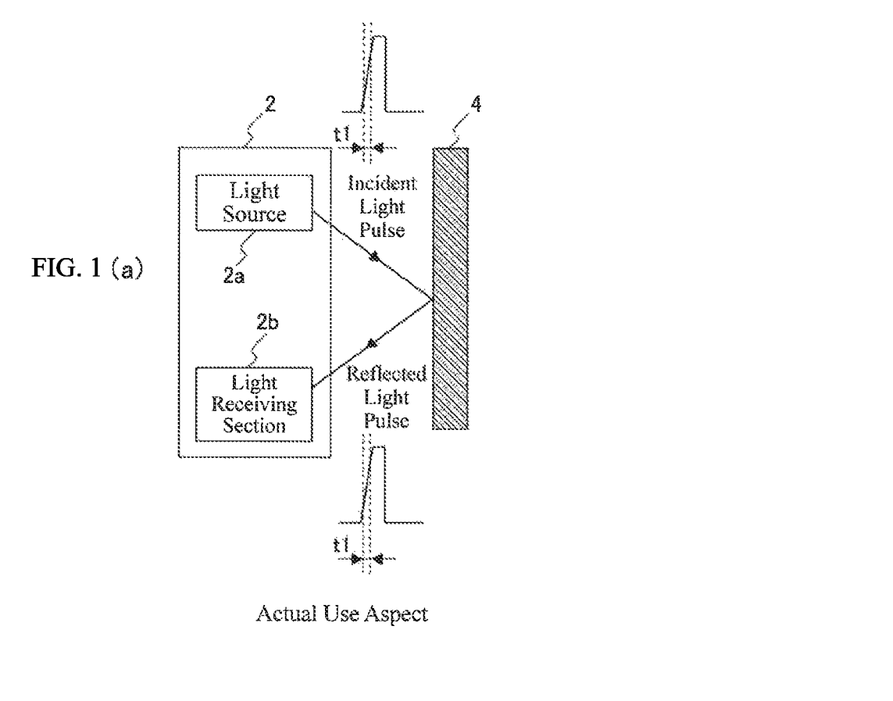

FIG. 1 shows an actual use aspect (FIG. 1 (a)) and a testing use aspect (FIG. 1 (b)) of an optical measuring instrument 2.

Referring to FIG. 1 (a), in the actual use aspect, the optical measuring instrument 2 is arranged to provide an incident light pulse from a light source 2a (see FIG. 2) to an incident object 4. The incident light pulse is arranged to be reflected at the incident object 4 to be a reflected light pulse and received by a light receiving section 2b (see FIG. 2) of the optical measuring instrument 2. The optical measuring instrument 2 is, for example, a LiDAR module or a ToF camera and used to measure the distance between the optical measuring instrument 2 and the incident object 4.

It is noted that if the incident light pulse has a rise time t1, the reflected light pulse also has a rise time t1. The rise time t1 of the incident light pulse has a distinct value depending on the light source 2a. The light receiving section 2b has a tolerance within which the rise time t1 of the reflected light pulse is allowed. When the rise time t1 of the reflected light pulse falls within the tolerance, the light receiving section 2b operates normally. When the rise time t1 of the reflected light pulse does not fall within the tolerance, the light receiving section 2b does not operate normally.

Referring to FIG. 1 (b), the optical testing apparatus 1 is used to test the optical measuring instrument 2. The testing is intended to, for example, check whether or not the light receiving section 2b of the optical measuring instrument 2 operates normally. The optical testing apparatus 1 is arranged to provide a testing light pulse to the optical measuring instrument 2, in which the testing light pulse also has a rise time t1. That is, the rise time t1 of the testing light pulse corresponds to the rise time t1 of the reflected light pulse. It is noted, as described below, that the rise time t1 of the testing light pulse is arranged to be controlled by an acousto-optical crystal (rise time control section) 18 (see FIG. 2).

Figure 4A:
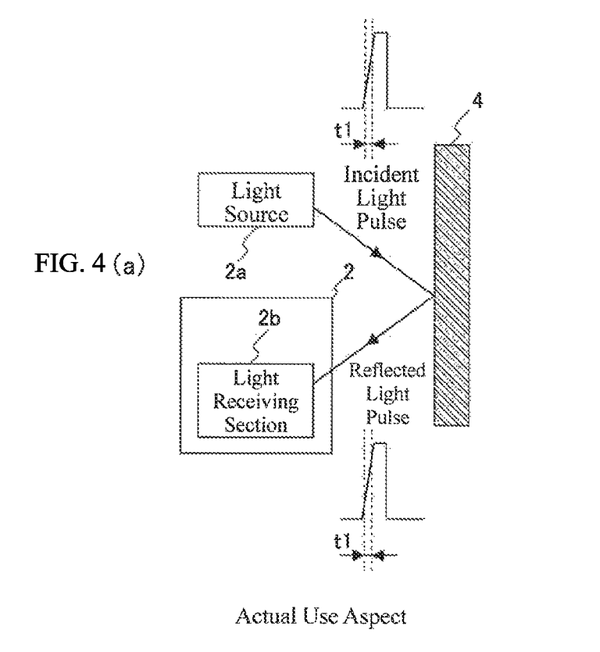
Figure 4B:
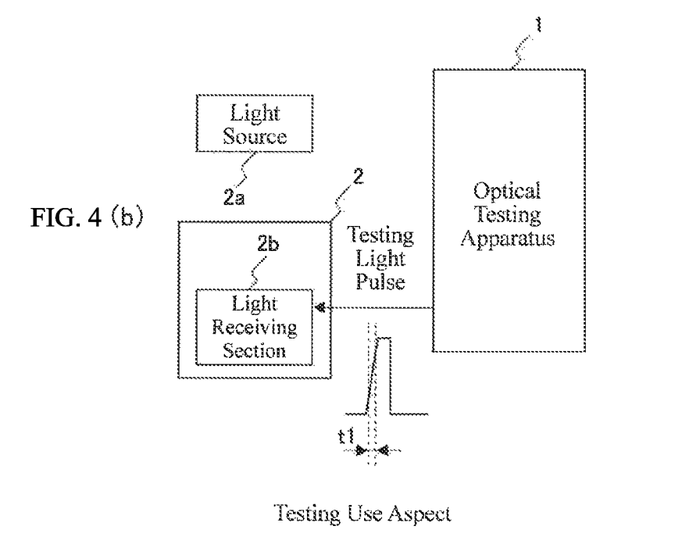

FIG. 4 shows an actual use aspect (FIG. 4 (a)) and a testing use aspect (FIG. 4 (b)) of an optical measuring instrument 2 according to a variation. While FIG. 1 shows that the optical measuring instrument 2 has the light source 2a and the light receiving section 2b, the optical measuring instrument 2 may only have the light receiving section 2b and the light source 2a may be arranged exterior to the optical measuring instrument 2, as shown in FIG. 4. The optical measuring instrument 2 is, for example, a ToF sensor. In any embodiment of the present invention, either the optical measuring instrument 2 shown in FIG. 1 or the optical measuring instrument 2 shown in FIG. 4 may be used.

Figure 2:
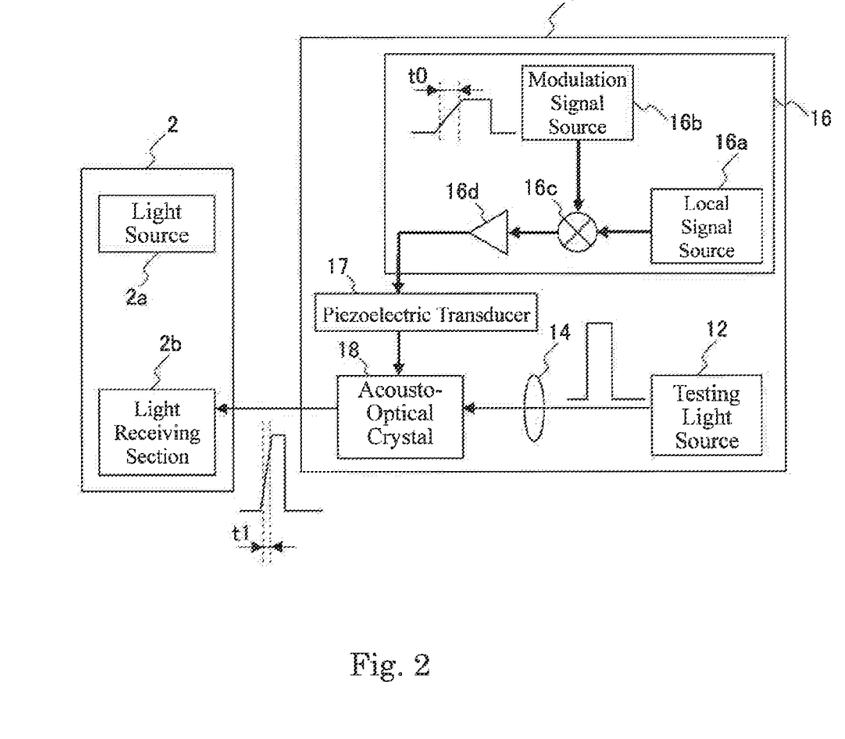
FIG. 2 is a functional block diagram showing the configuration of an optical testing apparatus 1 according to an embodiment of the present invention.

FIG. 2 is a functional block diagram showing the configuration of an optical testing apparatus 1 according to an embodiment of the present invention. Referring to FIG. 2, the optical testing apparatus 1 according to the embodiment of the present invention includes a testing light source 12, a lens 14, a controlling electrical signal output section 16, a piezoelectric transducer 17, and an acousto-optical crystal (rise time control section) 18.

The testing light source 12 is arranged to generate a testing light pulse to be provided to the optical measuring instrument 2 and provide it via the lens 14 to the acousto-optical crystal 18. It is noted that the testing light pulse provided to the acousto-optical crystal 18 has a rise time extremely shorter than t1 and having an ignorable value.

The lens 14 is arranged to receive and cause the testing light pulse generated by the testing light source 12 to have a reduced beam diameter for the acousto-optical crystal 18.

The acousto-optical crystal (rise time control section) 18 is arranged to control the rise time of the testing light pulse provided by the testing light source 12 to be t1 and output it toward the optical measuring instrument 2. It is noted that acousto-optical crystal 18 is arranged to control the rise time of the testing light pulse according to a controlling electrical signal (having a slowly rising envelope as described below) output from the controlling electrical signal output section 16. Specifically, the piezoelectric transducer 17 is arranged to receive and convert the controlling electrical signal into ultrasound, and the acousto-optical crystal 18 is arranged to receive the ultrasound to form a diffraction grating. The testing light pulse generated by the testing light source 12 is arranged to pass through the diffraction grating (as primary light) to have the rise time controlled to be t1 through the acousto-optical crystal 18.

The controlling electrical signal output section 16 has a local signal source (local electrical signal output section) 16a, a modulation signal source (electrical pulse output section) 16b, a mixer (multiplying section) 16c, and an amplifier 16d.

The local signal source (local electrical signal output section) 16a is arranged to output a local electrical signal with a predetermined frequency (e.g. 110 MHz).

The modulation signal source (electrical pulse output section) 16b is arranged to output an electrical pulse. Note, here, that the rise time t0 of the electrical pulse is longer than the rise time (approximately 0) of the testing light pulse output from the testing light source 12. The rise time t0 of the electrical pulse is variable, and the rise time of the testing light pulse can be controlled to be t1 by varying the rise time t0 of the electrical pulse. It is noted that the testing light source 12 is synchronous with the modulation signal source 16b.

The mixer (multiplying section) 16c is arranged to multiply the local electrical signal output from the local signal source 16a by the electrical pulse output from the modulation signal source 16b. This causes the local electrical signal to have a slowly rising envelope.

The amplifier 16d is arranged to receive and amplify the output from the mixer 16c to output as a controlling electrical signal.

Figure 3:
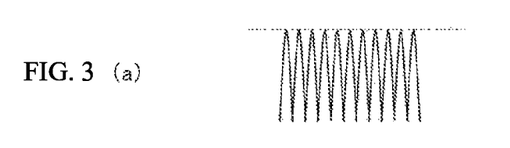

FIG. 3 shows timing charts of a local electrical signal output from the local signal source 16a (FIG. 3 (a)), an electrical pulse output from the modulation signal source 16b (FIG. 3 (b)), and an output from the mixer 16c (FIG. 3 (c)). FIG. 3 (a) shows a local electrical signal (solid line) and its envelope (dotted line). The envelope of the local electrical signal has a constant value with no rise time. Multiplying the local electrical signal by the electrical pulse (with a rise time t0) (see FIG. 3 (b)) results in the output from the mixer 16c (see FIG. 3 (c)). The output of the mixer 16c (solid line) takes time for its envelope (dotted line) to have a constant value. Given a time period Δt after the mixer 16c starts outputting until its envelope has a constant value, Δt is too large to ignore.

The piezoelectric transducer 17 is arranged to receive and convert the controlling electrical signal into ultrasound and provide it to the acousto-optical crystal 18. It is noted that the piezoelectric transducer 17 may be bonded to the acousto-optical crystal 18. Since Δt is too large to ignore, the time period after the start of ultrasound output until its intensity reaches a constant value is also too long to ignore.

Next will be described an operation according to the embodiment of the present invention.

A testing light pulse (with a rise time of approximately 0) generated by the testing light source 12 is provided via the lens 14 to the acousto-optical crystal 18.

Within the mixer 16c, a local electrical signal output from the local signal source 16a (see FIG. 3 (a)) is multiplied by an electrical pulse output from the modulation signal source 16b (see FIG. 3 (b)), and a signal with an envelope rising more slowly (with a rise time Δt) than the local electrical signal is output from the mixer 16c (see FIG. 3 (c)). The output from the mixer 16c is amplified through the amplifier 16d and provided as a controlling electrical signal to the piezoelectric transducer 17. The controlling electrical signal is converted through the piezoelectric transducer 17 into ultrasound and provided to the acousto-optical crystal 18. It takes some time after the start of the ultrasound output until its intensity reaches a constant value.

The acousto-optical crystal 18 receives the ultrasound and forms a diffraction grating. The testing light pulse generated by the testing light source 12 then passes through the diffraction grating. According to the time delay after the start of the ultrasound output until its intensity reaches a constant value, the testing light pulse (primary light) is also delayed to have a rise time t1. By varying t0 and therefore t1 to have their respective distinct values and, at the same time, verifying the operation of the light receiving section 2b, it is possible to measure the tolerance of the rise time of light pulses received by the optical measuring instrument 2.

In accordance with the embodiment of the present invention, the rise time t1 of the testing light pulse can be controlled to have a distinct value by varying the rise time t0 of the electrical pulse (see FIG. 3 (b)). Upon this, by checking whether or not the light receiving section 2b operates normally, it is possible to measure the tolerance of the rise time t1 of light pulses received by the optical measuring instrument 2.

It is noted that the embodiment of the present invention can have the following variation.

Figure 5:
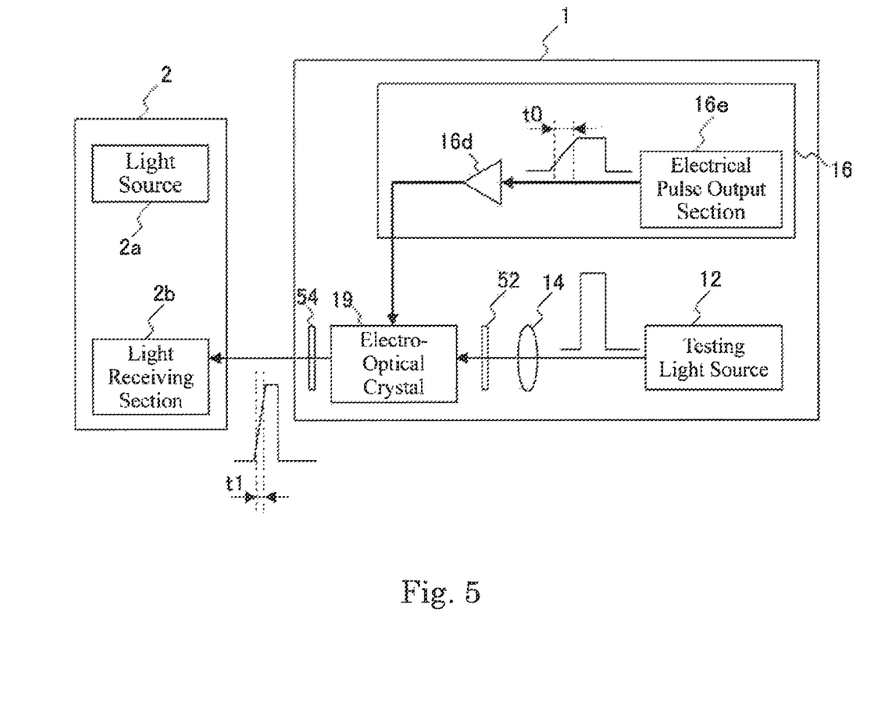
FIG. 5 is a functional block diagram showing the configuration of an optical testing apparatus 1 according to a variation of the embodiment of the present invention.

FIG. 5 is a functional block diagram showing the configuration of an optical testing apparatus 1 according to a variation of the embodiment of the present invention. Referring to FIG. 5, the optical testing apparatus 1 according to the variation of the embodiment of the present invention includes a testing light source 12, a lens 14, a controlling electrical signal output section 16, an electro-optical crystal 19, a first polarizer 52, and a second polarizer 54. Components identical to those in the above-described embodiment of the present invention will be designated by the same symbols to omit the description thereof.

The testing light source 12 and the lens 14 are the same as those in the above-described embodiment. It is noted that the testing light source 12 is synchronous with an electrical pulse output section 16e to be described below.

The electro-optical crystal 19, the first polarizer 52, and the second polarizer 54 constitute a rise time control section.

That is, the rise time control section has the electro-optical crystal 19, the first polarizer 52, and the second polarizer 54.

The electro-optical crystal 19 is, for example, $LiNbO_3$, $LiTaO_3$, showing the Pockels effect. The first polarizer 52 is arranged between the electro-optical crystal 19 and the testing light source 12 and has a polarized wave transmission axis inclined 45 degrees with respect to the electric field application direction of the electro-optical crystal 19. The second polarizer 54 is arranged to receive an output from the electro-optical crystal 19 and has a polarized wave transmission axis inclined 45 degrees with respect to the electric field application direction of the electro-optical crystal 19. It is noted that the polarized wave transmission axis of the first polarizer 52 is orthogonal to the polarized wave transmission axis of the second polarizer 54.

The controlling electrical signal output section 16 is arranged to output a controlling electrical signal. The rise time control section is arranged to control the rise time of the testing light pulse according to the controlling electrical signal.

The controlling electrical signal output section 16 has an electrical pulse output section 16e and an amplifier 16d. The electrical pulse output section 16e serves similarly as the modulation signal source 16b to output an electrical pulse with a rise time longer than that of the testing light pulse output from the testing light source 12 but, unlike the above-described embodiment, arranged to provide its output to the amplifier 16d.

The amplifier 16d is arranged to receive and amplify the output from the electrical pulse output section 16e to output as a controlling electrical signal.

The testing light pulse is divided through the first polarizer 52 into two polarized waves of ordinary light and extraordinary light to propagate through the electro-optical crystal 19. When the controlling electrical signal is provided to the electro-optical crystal 19 to apply an electric field, the phase difference between the polarized waves is modulated and thereby the state of the elliptical polarization changes. The light that has transmitted through the electro-optical crystal 19 then transmits through the second polarizer 54. The intensity of the light that has transmitted through the second polarizer 54 has a pulsed shape with a rise time t1, as is the case in the above-described embodiment. This variation also exhibits the same advantageous effects as the above-described embodiment.

DESCRIPTION OF REFERENCE NUMERAL

2 Optical Measuring Instrument
2a Light Source
2b Light Receiving Section
4 Incident Object
1 Optical Testing Apparatus
12 Testing Light Source
14 Lens
16 Controlling Electrical Signal Output Section
16a Local Signal Source (Local Electrical Signal Output Section)
16b Modulation Signal Source (Electrical Pulse Output Section)
16c Mixer (Multiplying Section)
16d Amplifier
16e Electrical Pulse Output Section
17 Piezoelectric Transducer
18 Acousto-Optical Crystal (Rise Time Control Section)
19 Electro-Optical Crystal
52 First Polarizer 54 Second Polarizer
t0, t1 Rise Time
Δt Time Period after mixer 16c starts outputting until its envelope has a constant value

The invention claimed is:

1. An optical testing apparatus used in testing an optical measuring instrument that provides an incident light pulse from a light source to an incident object and receives a reflected light pulse as a result of reflection of the incident light pulse at the incident object, the optical testing apparatus comprising:
   a testing light source arranged to generate a testing light pulse to be provided to the optical measuring instrument;
   a rise time control section arranged to control a rise time of the testing light pulse;
   a controlling electrical signal output section arranged to output a controlling electrical signal; and
   a piezoelectric transducer arranged to receive and convert the controlling electrical signal into ultrasound,
   wherein the rise time control section is an acousto-optical crystal, and
   the rise time control section is arranged to receive the ultrasound and control the rise time of the testing light pulse according to the controlling electrical signal.

2. The optical testing apparatus according to claim 1, wherein
   the optical measuring instrument is a ToF sensor.

3. The optical testing apparatus according to claim 1, wherein
   the rise time controlled by the rise time control section corresponds to the rise time of the reflected light pulse.

4. An optical testing apparatus used in testing an optical measuring instrument that provides an incident light pulse from a light source to an incident object and receives a reflected light pulse as a result of reflection of the incident light pulse at the incident object, the optical testing apparatus comprising:
   a testing light source arranged to generate a testing light pulse to be provided to the optical measuring instrument; and
   a rise time control section arranged to control a rise time of the testing light pulse, wherein the rise time control section includes:
      an electro-optical crystal;
      a first polarizer arranged between the electro-optical crystal and the testing light source and having a first polarized wave transmission axis inclined 45 degrees with respect to an electric field application direction of the electro-optical crystal; and
      a second polarizer arranged to receive an output from the electro-optical crystal and having a second polarized wave transmission axis inclined 45 degrees with respect to the electric field application direction of the electro-optical crystal, and
   the first polarized wave transmission axis of the first polarizer is orthogonal to the second polarized wave transmission axis of the second polarizer.

5. The optical testing apparatus according to claim 4, further comprising:
   a controlling electrical signal output section arranged to output a controlling electrical signal, wherein
   the rise time control section is arranged to control the rise time of the testing light pulse according to the controlling electrical signal.

6. The optical testing apparatus according to claim 5, wherein
   the controlling electrical signal output section has an electrical pulse output section arranged to output an electrical pulse with a rise time longer than that of the testing light pulse output from the testing light source.

7. The optical testing apparatus according to claim 4, wherein
   the optical measuring instrument is a ToF sensor.

8. The optical testing apparatus according to claim 4, wherein
   the rise time controlled by the rise time control section corresponds to the rise time of the reflected light pulse.

* * * * *